United States Patent [19]

Delam

[11] Patent Number: 4,489,991

[45] Date of Patent: Dec. 25, 1984

[54] ELASTIC SUPPORT FOR MACHINES

[75] Inventor: Heinz Delam, Berlin, Fed. Rep. of Germany

[73] Assignee: GERB Gesellschaft für Isolierung mbH & Co. KG, Berlin, Fed. Rep. of Germany

[21] Appl. No.: 413,535

[22] Filed: Aug. 31, 1982

[51] Int. Cl.³ .................. F16C 27/00; F16C 35/00
[52] U.S. Cl. .................. 384/428; 248/638; 384/536
[58] Field of Search .................. 308/184 R, 178; 384/428, 438, 440, 444, 215, 219, 192, 247, 252, 253, 256, 257, 267, 271; 33/162, 181 R; 248/550, 636, 638, 560

[56] References Cited

U.S. PATENT DOCUMENTS

| | | | |
|---|---|---|---|
| 1,677,496 | 7/1928 | Sessions | 384/253 |
| 1,683,351 | 9/1928 | Herr | 384/219 |
| 2,359,941 | 10/1944 | Rosenzweig | 248/638 X |
| 2,929,592 | 3/1960 | Spaetgens | 248/638 X |
| 3,037,573 | 6/1962 | Larsen | 308/184 R X |
| 3,494,678 | 2/1970 | Reznick et al. | 308/184 R X |

FOREIGN PATENT DOCUMENTS 1195556  6/1965  Fed. Rep. of Germany ...... 248/560

*Primary Examiner*—Stuart S. Levy
*Assistant Examiner*—Thomas Hannon
*Attorney, Agent, or Firm*—Horst M. Kasper

[57] ABSTRACT

A vibration damping adjustable support for machines. A base plate supports elastically a machine. A bearing element is disposed below the base plate for supporting the base plate and an adjustment device is provided for changing the supporting condition of the bearing element. A regulating provision is furnished for effecting a change in the support conditions for a shafting arrangement of an elastically supported machine by way of changing the supporting forces. Depending on the deviations from a set point value found with a surveying measurement device the supporting force of spring bodies disposed below the base plate are changed until the set point is reached again. In this manner relatively small deformations of foundations of the base plate can be achieved by way of relatively large adjustment distances at the elastic supporting element for aligning and realigning of shafting arrangements.

14 Claims, 4 Drawing Figures

ELASTIC SUPPORT FOR MACHINES

BACKGROUND OF THE INVENTION

1. Field of the Invention

The present invention relates to an elastic support for machines, in particular in connection with flexible supported base plates for machines with shafting arrangements.

2. Brief Description of the Background of the Invention Including Prior Art

The alignment is an important part in the setting up of large machines, for example of turbogenerator sets having relatively long running through shafting arrangements with several shaft bearings, in order to assure a disturbance free operation and a long life time. According to the present state of the art machines comprising several bearings and having a shafting with several rotors or aggregates are mounted as follows:

Upon separate delivery of rotors and casings, initially the bearings are aligned with respect to each other. After the insertion of the rotor upon rotation in one direction of rotation, the coupling imperfections such as eccentricity and impact and the play of the bearing are employed for realignment. At times also the elastic elements under the base plate are employed for the realignment of the shafting arrangement in the final mounting. However, a realignment of the shafting is not provided via forced deformations of the base plates with the aid of elastic set elements at the operation of the plant.

It is important for the economic operation of such plants that the required state of alignment at the start-up can be maintained as long as possible even after thermal expansion of the foundation. The stability of constant alignment is here decisive for example for the intervals between service and their economic significance justifies a considerable expenditure for the surveillance of the aligned state.

In view of this one has started to survey not only the quietness of running but also the shafting itself continuously and to consider also the causes of the changes of the alignment into the surveillance. The knowledge obtained in this fashion about the system behavior of shaft and foundation can have influence on future constructions of corresponding plants.

Relatively large bearing elasticities are provided upon use of flexible supported base plates at the elastic supporting of machines, which achieve that the vibrations generated in the machine are not radiated via the foundation into the environment.

The flexible supported base plate assumes a bending line on the elastic support elements corresponding to the bearing conditions in the situation. The bending line can be corrected by changing the support forces of the base plates, since the bending line depends on these support forces. The corresponding holds for the twisting and rotation of elastically supported plates and frames.

The elastic elements of the support can comprise rubber or neoprene or are formed by steel springs provided as so-called spring bodies. The transmission of vibrations is decreased based on the elastic support elements. At the same time multiple supported, statically indefinite supported foundations are transformed into a nearly statically determined symmetry. The lower restraining forces provided by the elastic support allow to produce foundations of less weight and more economically, as it would have been possible according to older codes requiring foundations resistant to bending such as the German Industrial Standard DIN 4024 of January 1955.

An elastic support is state of the art in particular at large or respectively long machines with several shaft bearings and continuous shafts such as employed for example in turbogenerator sets. At the present time the elastic elements are pretensioned before the construction of the foundation corresponding to the bending line of the foundation for the operating loads to be expected. During the mounting of the machine the foundation is also retensioned with the aid of shims or via hydraulic pistons or blocking spindels. However, up to now no retightening of the foundation has been provided to perform a resetting of the shafting arrangement during operation, in particular not as an automatic operation-connected alignment control.

At the elastic elements the bearing forces are proportional to relatively large deformation lengths. In contrast, in general the stiffness of a machine foundation can be considered to be substantially larger than the stiffness of the support elements.

SUMMARY OF THE INVENTION

1. Purposes of the Invention

It is an object of the present invention to provide a method for controlling in a simple way the support forces on foundation plates.

It is another object of the present invention to provide an adjustment system for foundations where small deformations in the foundation can be achieved via a long setting length at the elastic element.

It is a further object of the present invention to provide a method for the alignment of the shafts of elastically supported machines comprising several rotating rotors or aggregates.

These and other objects and advantages of the present invention will become evident from the description which follows.

2. Brief Description of the Invention

The present invention provides a method for alignment of shafts disposed on elastic or flexible base plates which comprises sensing continuously the quietness of the running of the shafting arrangement of the machine positioned on the base plates supported by way of a spring element and resetting an adjustment device for the support force of the spring element disposed below the base plate depending on deviations from the set point observed by the sensing until the set point has been reached again.

The adjustment device can change the support conditions of the base plate and the adjustment device can be incorporated into the spring element. An existing solid connection between the base plate and the spring element can be disengaged for the resetting process, the adjustable element can then be set, and the solid connection can again be provided. Hydraulic elements can be employed for changing the support conditions of the base plates. Alternatively or in addition, mechanical and/or electromechanical provisions can be employed for setting and/or changing the support condition.

The quietness of the running of the shaft can be sensed by electrical and/or electronic means. A control circuit can be employed between the sensor determining changes of the measurement and the adjustment devices to reset the support conditions. The control of the quietness of the running of the shaft can be optimized automatically via a process control computer. The position of the setting elements can be sensed in order to furnish proper adjustment. The state of the solid connection between the bearing element and the base plate can be measured in order to test for a need regarding adjustments.

According to another aspect of the invention there is provided a vibration damping adjustable support for machines which comprises a base plate for supporting elastically a machine, a bearing or support element below the base plate for supporting the base plate, and an adjustment device for changing the supporting condition of the bearing element.

A mounting means can be provided to furnish a solid connection between the base plate and the bearing element. A measurement device can be provided for ascertaining the state and/or position of the solid connection between bearing element and base plate. The mounting means can include an adjustable wedge connection.

An adjustment device can be incorporated into the bearing element and can be a hydraulic element and/or an electrical and/or an electromechanical element. A measurement device can determine the state and size of the support force changes in the bearing element. The bearing element can be provided by a mechanical spring.

The machine supported on the base plate can include a power transmission via a rotary shafting arrangement. A sensing element can be provided for continuously surveying the vibrations of the rotary shafting arrangement. A means can be provided for controlling the adjustment device based on signals provided by the sensing element. A process control computer can be connected to the sensing element and to the adjustment device for automatically optimizing the control process.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing in which are shown several of the various possible embodiments of the present invention.

DESCRIPTION OF INVENTION AND PREFERRED EMBODIMENTS

Figure 1:
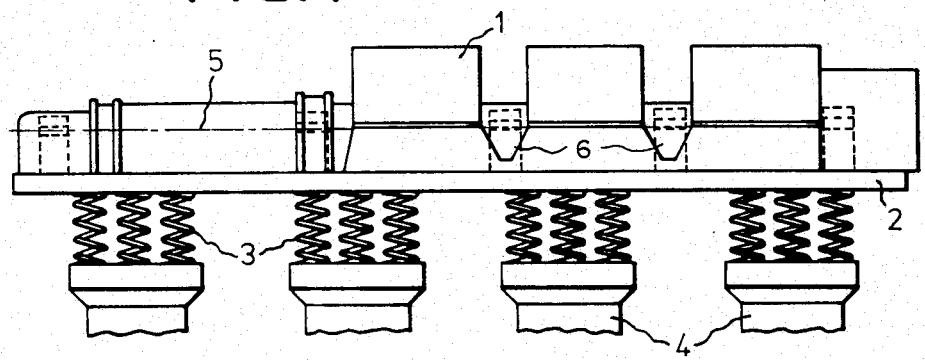
FIG. 1 is a view of a schematic elevational representation of an elastically supported turbogenerator set.

In accordance with the present invention there is provided an elastic support element and in particular a spring element, for flexible supported foundation plates for the elastic installation of machines. A regulating device is provided in the element, which provides for an adjustment of the support conditions for a shafting arrangement of the elastically installed machine via a change of the supporting forces. Since at elastic elements the bearing forces are proportional to large deformation lengths, the present invention provides small foundation deformations produced by large setting changes at the elastic element in order to align a shafting arrangement.

A solid connection can be provided between the support element and the foundation plate covering of the full range of settings such as for example by way of an adjustable wedge connection, which can be disengaged for providing further adjustments. Preferably, the set device is a hydraulic provision and/or is actuated by electrical and/or electromechanical means 22. A measuring device can be provided for determining the state of the solid connection between the support element and the foundation plate and/or for determining the state and the size of a load power change of the support element.

There is further provided a method for aligning of shafts of elastically installed machines on flexible supported foundation plates by way of spring elements disposed under the foundation plate, where the quietness of running of the shafting arrangement is continuously surveyed. The supporting force of individual spring elements disposed under the foundation slab is changed by way of adjustment devices depending on deviations from the set point until the set point is reached again.

The support conditions of the foundation plate can be changed by way of adjustment devices, where the adjustment devices are incorporated into the spring body. An existing solid connection of the foundation plate can be disengaged for the setting process, can be changed during the setting process and can be provided again after the setting process. Hydraulic elements, mechanical or electromechanical elements can be employed for changing the support conditions. The setting conditions can be sensed electrically or electronically. A control circuit 23 can be provided between a sensor device for the changes of the shafting arrangement and the changes of the support conditions. An automatic optimization of the control can be provided by continuous process computing, for example in a microprocessor.

Thus the height or respectively the support force of the support element can be changed. The in turn resulting change of the support conditions effects the aligning and realigning of the shafting arrangement via the corresponding changed bending line of the flexible support foundation plate.

In general the elastic support comprises several support points, where a group of support elements is coordinated to each support point. In many cases the installation of one support element for each support point is sufficient with a resetting provision, in order to achieve the described effect.

In case the additional regulating device cannot be continuously ready for operation such as for example in case of a hydraulic actuation, then the elastic element advantageously is provided with a settable blocking provision, which in the most simple way can comprise a bolt arrangement or a wedge.

The above described control with hydraulically actuated regulating elements requires a continuous readiness of the hydraulics in the regulating elements. The failure of the hydraulic pressure would result solely in the reoccurring of the state at start-up and would not mean any danger to the plant. This may be nevertheless unacceptable if the regulations do not allow this. In such cases after each change of a regulating element the joint between the foundation plate and the bearing element has to be bridged by a rigid intermediate piece.

In order not to have to continuously realign during operation, but to be able to have this process performed with remote control, the regulating device can be provided with a remotely controllable actuating device such as for example a hydraulic or an electromagnetic device. It allows the disengaging of the solid connection, the alignment of the shafting, the shifting of the blocking device to the new pretensioning and thereafter the renewed production of the solid connection.

By way of the additional equipping of the elastic element with a sensor of the state for the blocking device and for the elastic element, the elastic element is provided with all required facilities to render automatic the alignment of the shafting. A self-optimization is possible by introduction of a microprocessor, which enables the maintenance of alignment states, the accuracy of which depends only on the accuracy of the measuring process.

Upon employment of a microprocessor controlled measuring and regulating system there results the possibility to consider the influences of the individual support changes and to make them available for automatic optimization by a computer calculation of the support conditions relative to the state of the alignment.

The precision reached in this way provides operating conditions which survey the quality of the state at the beginning of operation for an indefinite time, and possibly even surpass.

The big economic importance of such elastic elements becomes particularly clear in the context of their use for the support of turbogenerators in power plants. In addition to the more economic production of the foundation, the operation of the plant for example substantially depends on the time interval between required service maintenance, the quietness of running of the aggregate or respectively on the state of alignment of the shafting. For these maintenance services the plant has to be disconnected from the grid and the turbogenerator has to be stopped. The realignment of the shafting is then performed at the casings of the machines proper.

By employing the elastic elements according to the present invention the interval between maintenance service cannot only be increased considerably, but at the same time the thermal expansions are balanced, which necessarily occur during renewed start-up and which change the alignment. A reduction of wear is also possible besides the other advantages.

Based on the different elasticities of the foundation and of the support elements as well as the circumstance that only one or several elements are controlled, small foundation deformations can be produced with large setting changes at the support element. Manually performed changes of the supporting conditions have shown that a change in the height of the elastic elements by several millimeters result in a change deviation of the shaft line in the order of magnitude of tens of micrometers. The alignment and realignment of the shafting supports provided in this manner with high accuracy effects that foundation deformations influence only very little the running state of the machine.

Referring now to FIG. 1 there is shown a turbogenerator set 1 installed on a base plate 2. In order to provide an elastic support of the turbogenerator set 1, the in general flexible base plate 2 is supported by conventional elastic springs 3, which in turn are placed on foundation supports 4. A shafting arrangement 5 of the turbogenerator set 1 is supported in bearing blocks 6, which in turn are installed on the foundation plate 2.

Corresponding to the bending line of the foundation plate 2 the spring bodies 3 are pretensioned for the operating loads to be expected before the initial installation. Then the foundation plate 2 is retensioned in a way known in principle such that a complete quietness of running can be expected during the operation of the shafting arrangement 5. A retensioning during the later operation does not occur, but the realignment becoming necessary from time to time is provided by aligning of the bearing blocks 6 or the like during the service maintenance, that is while the machine is at rest.

Figure 3:
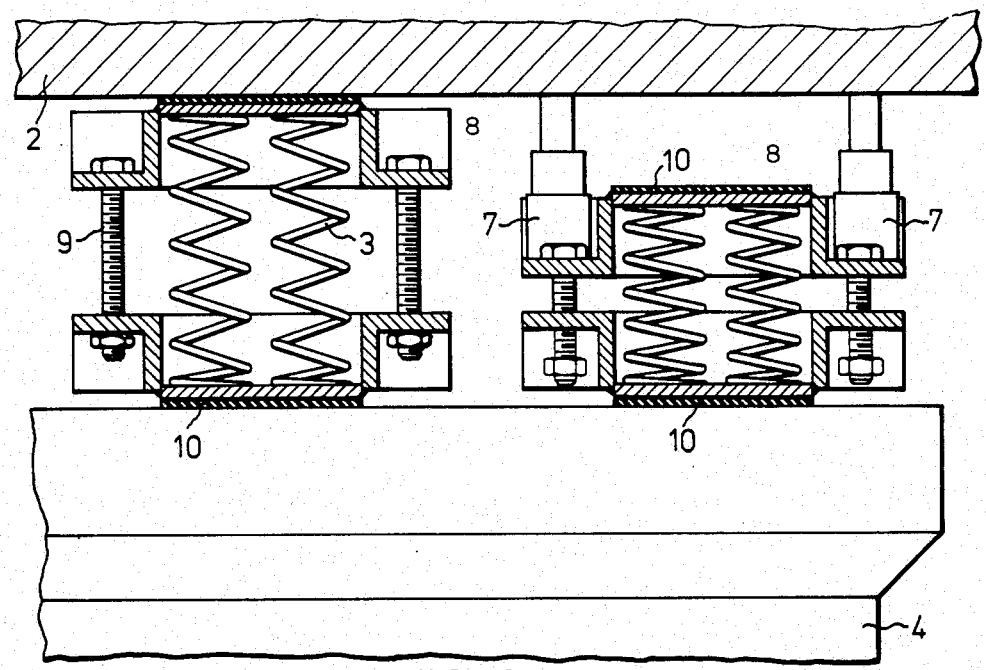
FIG. 3 is a view of an enlarged detail of FIG. 2.

According to the invention separate regulating units 7 are disposed in the spring bodies 3, which are permanently installed and which cause a change of the support forces of the shafting arrangements based on a change of the support forces of the spring bodies 3. In particular, FIG. 3 shows that hydraulic regulating units 7 are disposed in the spring body shell 8, such that a uniform change of the support force of the spring body 3 results upon actuation of the regulating units 7. Bolts 9 serve to provide pretension before mounting. Intermediate layers 10 provide a substantially perfect and in particular sliding resistant connection between the spring body 3 and the foundation plate 2 or respectively the foundation supports 4.

Figure 4:
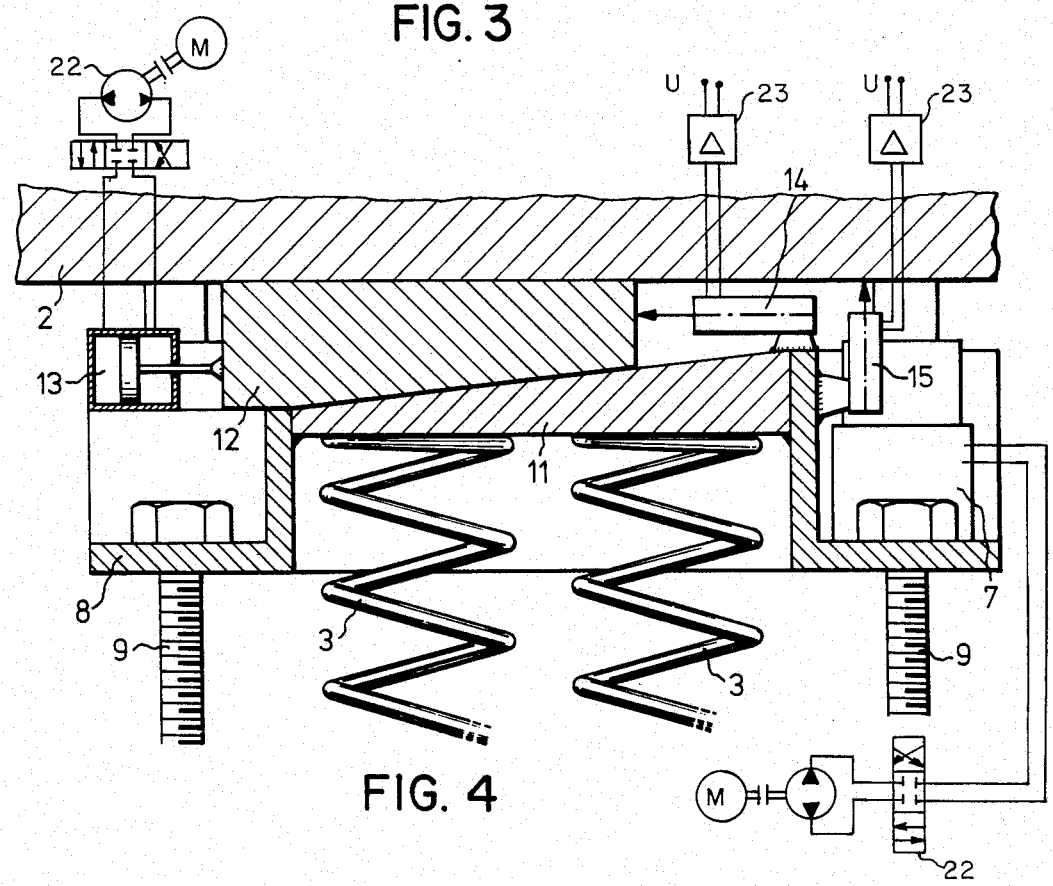
FIG. 4 is a view of a detail of FIG. 3 further enlarged.

In order for the foundation plate 2 not to be disposed immediately upon the stamps of the regulating units 7, a solid connection is provided between the spring bodies 3 and the foundation plate 2 over the complete regulating range by way of an adjustable wedge connection 11, 12, as can be recognized from FIG. 4. A wedge-shaped plate 11 concluding the spring body shell 8 at the top serves as an inclined plane for a wedge 12.

The wedge connection 11, 12 is adjustable and is disengaged by actuation of the regulating provision 7. A regulating cylinder 13 provides the necessary adjustment of the wedge 12 in the wedge connection serving as a blocking device. The wedge carry the foundation plate there, which decreases the load on the regulating provision 7.

A measuring device 14 serves to determine the state or, respectively, the position of the wedge 12. A further measuring unit 15 serves to determine the state or, respectively, the size of the change in supporting force of the spring body 3. The corresponding data of the measuring devices 14 and 15 allow a continuous automatic realignment of the shafting 5 depending on the occurring changes of state by application of known principles of process control.

Figure 2:
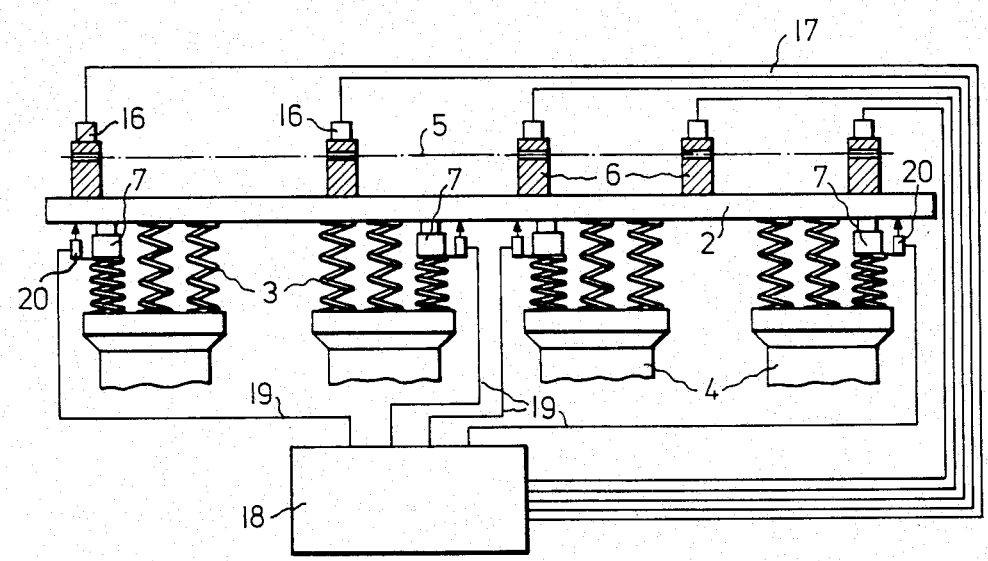
FIG. 2 is a view of a schematic elevational representation similar to the view of FIG. 1 with an indication of the shafting arrangement of a turbogenerator set, where the support elements are constructed in accordance with the present invention.

A corresponding control circuit is indicated in FIG. 2. The bearing blocks 6 are provided with vibration generators 16, which signal deviations for example of the quietness of running of the shafting 5 to a process control computer 18 via channels 17. The process control computer 18 in turn provides corresponding signal orders via channels 19 to the regulator or distance pickups 20 in order to cause the regulating provisions 7 to act as described above.

It will be understood that each of the elements described above, or two or more together, may also find a useful application in other types of foundation providing and machine aligning system configurations and vibration and shock insulating procedures differing from the types described above.

While the invention has been illustrated and described as embodied in the context of a vibration damping adjustable support suitable for maintaining shafting arrangements aligned, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method for alignment of shafts disposed on an elastic or flexible base plate comprising sensing continuously the quietness of the running of a shafting arrangement of a machine positioned on the base plate supported by way of a spring element requiring a support force;
   ascertaining the state of the solid connection between bearing element and base plate with a measurement device; determining the state and size of support force changes in the spring element;
   resetting a hydraulic adjustment device incorporated into the spring element for the support force of the spring element disposed below the base plate depending on deviations from a set point observed by the sensing until the set point has been reached again and for changing the support conditions of the base plate;
   disengaging an existing solid connection between the base plate and the spring element for the resetting process; setting the adjustable element; and providing again said solid connection.

2. The method for alignment of shafts according to claim 1 further comprising employing mechanical provisions for changing the support conditions.

3. The method for alignment of shafts according to claim 1 further comprising sensing the quietness of the running of the shaft by electrical and/or electronic means.

4. The method for alignment of shafts according to claim 1 further comprising employing a control circuit between the sensor determining changes of the measurement of the conditions of the shafting arrangement and the hydraulic adjustment device to reset the support conditions.

5. The method for alignment of shafts according to claim 1 further comprising optimizing automatically the control of the quietness of the running of the shaft via a process control computer.

6. The method for alignment of shafts according to claim 1 further comprising sensing the position of the setting elements in order to furnish a proper adjustment.

7. The method for alignment of shafts according to claim 1 further comprising measuring the state of the solid connection between the bearing element and the base plate in order to test for need of adjustments.

8. A vibration damping adjustable support for machines comprising
   a base plate for supporting elastically a machine; a bearing element disposed below the base plate for supporting the base plate;
   a hydraulic adjustment device incorporated into the bearing element for changing the supporting condition of the bearing element;
   mounting means including an adjustable wedge connection for providing a solid connection between the base plate and the bearing element; and
   a measurement device for ascertaining the state of the solid connection between bearing element and base plate and for determining the state and size of support force changes in the bearing element.

9. The vibration damping adjustable support according to claim 8 wherein the bearing element is provided by a mechanical spring.

10. The vibration damping adjustable support according to claim 8 wherein the machine includes power transmission via a rotary shafting arrangement.

11. The vibration damping adjustable support according to claim 10 further comprising a sensing element for continuously surveying the vibrations of the rotary shafting arrangement.

12. The vibration damping adjustable support according to claim 11 further comprising means for controlling the adjustment device based on signals provided by the sensing element.

13. The vibration damping adjustable support according to claim 10 further comprising a process control computer connected to the sensing element and to the adjustment device for automatically optimizing the control process.

14. The vibration damping adjustable support according to claim 13 wherein the means for controlling comprises an electronic circuit.

* * * * *